United States Patent [19]

Cushing

[11] 4,121,454

[45] Oct. 24, 1978

[54] CLAMP ON ELECTROMAGNETIC FLOW TRANSDUCER

[75] Inventor: Vincent J. Cushing, Northbrook, Ill.

[73] Assignee: Monitek, Inc., Redwood City, Calif.

[21] Appl. No.: 747,276

[22] Filed: Dec. 3, 1976

[51] Int. Cl.² .................................................. G01F 1/58
[52] U.S. Cl. .............................. 73/194 EM; 73/170 A
[58] Field of Search .............. 73/170 A, 194 EM, 189

[56] References Cited

U.S. PATENT DOCUMENTS

| | | | |
|---|---|---|---|
| 3,214,728 | 10/1965 | Higgins | 73/170 A X |
| 3,314,009 | 4/1967 | Murdock | 73/170 A X |
| 3,365,943 | 1/1968 | Bloch | 73/189 |
| 3,712,133 | 1/1973 | Westersten | 73/194 EM |
| 3,759,097 | 9/1973 | Cushing | 73/194 EM |
| 3,971,251 | 7/1976 | Niskin | 73/170 A |
| 4,015,471 | 4/1977 | Marsh | 73/194 EM |

*Primary Examiner*—Charles A. Ruehl

*Attorney, Agent, or Firm*—Pollock, Vande Sande & Priddy

[57] ABSTRACT

An electromagnetic flow transducer capable of mounting onto any selected point of a continuous cable without requiring the cable to be cut. The flow transducer has a housing, which surrounds the cable, having an appropriate hydrodynamic shape to minimize the disturbance to the flow sought to be measured. The housing also includes magnetic field producing means therein as well as a plurality of sensing electrodes mounted on, or extending slightly beyond, the surface of the housing. The cable onto which the transducer is mounted may perform the function of supporting the transducer, and any other transducers mounted below it, as well as transmitting signals to surface mounted apparatus or power therefrom to one or more of the transducers. In the alternative, the cable may only perform the function of transmitting signals to surface mounted apparatus and/or power therefrom, or it may be employed solely to support the transducer as well as any other transducers mounted below it.

10 Claims, 8 Drawing Figures

CLAMP ON ELECTROMAGNETIC FLOW TRANSDUCER

FIELD OF THE INVENTION

The present invention relates to electromagnetic flow transducers and more particularly, to transducers adapted to be mounted onto any selected point of a continuous cable.

BACKGROUND OF THE INVENTION

The electromagnetic flow transducer is well known to those skilled in the art; for example, see my prior U.S. Pat. No. 3,759,097. The transducer itself comprises at least a magnetic field producing device and a plurality of sensing electrodes adapted to sense the voltage induced by reason of the flow of a medium in which the transducer is situated. Since the transducer is limited to measuring flow in the plane in which the sensing electrode is lying, it has been proposed in the past to use a plurality of transducers to sense flow at different depths in a medium, such as in a body of water, for example, the ocean. To perform such a function, the plurality of transducers must, of course, be supported at different depths in the medium and normally the transducers are supported from above by some apparatus mounted on or above the surface of the medium.

To provide such an arrangement a cable may be provided to support the plurality of transducers at different depths in the medium. In addition, certain types of electromagnetic transducers require plural conductors connecting the transducer to surface mounted apparatus. Such conductors may be required, for instance, to provide energizing power for the transducer and/or to conduct the signals generated by the transducer to the surface for recording and/or transmission. The conventional practice has been to provide a support cable, either separately or in conjunction with the signal or power conductors, of various lengths equal to the distance between the several transducers. This practice requires, for instance, the first or uppermost transducer to be attached to the end of an appropriate length of cable and then, in those cases in which the cable includes conductors, making appropriate conductive connections to the different transducers, for each conductor. Once such an arrangement has been fabricated, it is obviously impossible to vary the depths at which the various transducers are located without providing new lengths of cables. In addition, the separate connection required for each conductor, to each transducer, is time-consuming, subject to error and increases the possibility of failures. For example, while only six or so conductors may be necessary for each transducer, the conventional practice would require approximately 12 connections multiplied by the total number of transducers for each transducer. This can rapidly reach burdensome proportions for even only three transducers.

The prior art provides some relevant teachings, although a review of this art indicates that the difficulties in providing an electromagnetic flow transducer which can be located at any selected point on a cable, for detecting open field flows, have not been overcome. In particular, teachings such as those of Wyatt (U.S. Pat. No. 3,681,986) and Westersten (U.S. Pat. No. 3,712,133) teach providing electromagnetic flow meters for measuring flow in confined conduits, where the transducer is in the form of an annulus surrounding the conduit. Although such transducers can be placed at any location on the conduit, they are not suitable for detecting open field flow. On the other hand, reference such as Kahl (U.S. Pat. No. 3,769,928), Hickey (U.S. Pat. No. 3,927,562) and Murdock (U.S. Pat. No. 3,314,009) disclose providing transducers for measurement in open bodies, which transducers can be located at any point on a cable. However, the first two mentioned patents do not relate to electromagnetic flow transducers. The last-mentioned patent relates to detecting characteristics of sea water including flow velocity and direction. While the device disclosed may be suitable for measuring such scalar quantities such as pressure, temperature, salinity, etc., it has a significant drawback in terms of measuring vector quantities, such as flow velocity and direction. In particular, reference to that patent will illustrate that it is asymmetrical, in that the transducer, per se, (referred to as 32 in FIG. 3 for instance) is asymmetrically located with regard to the cable. Depending upon the flow direction, with respect to the transducer's location relative to the cable, the transducer may well be in the wake or shadow of the cable, and thus produce signals which are not truly representative of flow velocity and direction in undisturbed areas.

Therefore, it is one object of the present invention to provide an electromagnetic flow transducer which is adapted to be located at any point on a continuous cable. It is another object of the present invention to provide such a transducer which can be so connected at any point on a continuous cable which includes a plurality of different conductors. It is still another object of the present invention to provide an electromagnetic flow transducer of the foregoing type in which the only conductive connections that are necessary are those which are appropriate to that transducer. It is yet another object of the present invention to provide an electromagnetic flow transducer of the foregoing type which simplifies the electrical and support connections for multi-transducer apparatus.

SUMMARY OF THE INVENTION

The present invention meets these and other objects by providing an electromagnetic flow transducer which is adapted to be mounted at any selected point on a continuous cable. The cable referred to may provide for support of the plurality of transducers, and may or may not include a plurality of conductors for powering the different transducers, and/or for transmitting the electrical signals generated by different ones of the transducers to other apparatus. Each of the flow transducers may include an appropriate hydrodynamically shaped housing so as to minimize the disturbance to the flow by reason of the transducer itself. Included in this housing are magnetic field generating means for providing the necessary magnetic field for the transducer. The housing is so designed as to surround the cable to obviate the problem created by the Murdock device. The housing also has mounted on, or extending slightly beyond, the surface of the housing a plurality of electrodes to sense the flow induced voltage. The housing may comprise a non-conductive external surface and be non-magnetic, the interior is at least partially potted after fabrication. For example, the housing may be fiberglass or a non-magnetic stainless steel with an insulating surface layer.

In one embodiment of the invention, the housing takes the form of a right cylinder and the cable is located radially offset from the center so that the magnetic field producing means, which may take the form of a conventional electromagnet, may be centered in a plane transverse to the longitudinal extent of the transducer.

In another embodiment of the invention, the cable is located centrally in planes transverse to the longitudinal extent of the transducer. Magnetic field producing means, in this embodiment, comprise a plurality of electromagnets, equal in number to the number of sensing electrodes; each of the electromagnets located adjacent one of the sensors.

BRIEF DESCRIPTION OF THE DRAWINGS

In order to facilitate an understanding of the invention, the detailed description thereof, which follows, refers to the attached drawings, in which like reference characters identify identical apparatus and in which.

DETAILED DESCRIPTION OF THE INVENTION

Figure 1A:
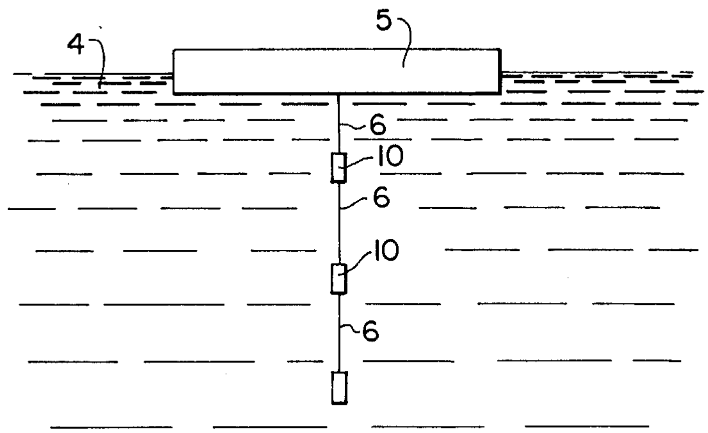
FIG. 1A is a representation of a multi-transducer array for detecting flow velocity at a variety of depths.

As shown in FIG. 1A, a plurality of transducers 10 are supported at different depths below the surface 4 of a medium by cable 6. Cable 6 is attached to a body 5 which may be floating on the surface of medium 4 by means not illustrated. One typical example of the apparatus illustrated in FIG. 1A may be that of an array of transducers 10 supported on a buoy 5 which is floating on the surface of the ocean 4. The cable 6 thus supports different ones of the transducers 10 at different depths below the surface of the ocean 4. This example should not be taken as limiting the invention to employment in measuring flow velocities at different depths in oceans, but the medium 4 can be any medium in which it is desired to measure flow velocity at different locations, and instead of a buoy 5, the cable 6 may be supported by being connected to a structure which is actually mounted or supported by a naturally occurring formation such as the bottom of the coean or an ice floe. Or further, cable 6 may be anchored on the bottom, and maintained reasonably vertical by means of a float, which may be submerged well below the water surface. Conventional practice, in providing such an array of transducers 10 has been to cut a plurality of lengths of cable 6 such that a first length of cable 6 can be connected to the device 5 and to one end of a first transducer 10. The next length of cable is connected to the other end of the first transducer 10 and to a first end of a second transducer 10. Finally, another length of cable 6 is connected to the other end of the second transducer and a first end of a third transducer. Although not illustrated, those skilled in the art will understand that an almost unlimited number of transducers can be so supported with proper lengths of cable 6. The problems inherent in this conventional practice should be apparent, i.e., in those cases where signals from each of the transducers are to be conducted to a common recording and/or transmitting apparatus not located at the transducer, at least one and perhaps multi-conductors, must be provided for that purpose and connected to each of the different transducers 10. Since no provision is made for a continuous cable 6, each of these conductors must be broken at every transducer 10, requiring a separate connection therefor. In addition, a second separate connection is required for each of the conductors to connect it to the transducer immediately above and/or to the recording and/or transmitting apparatus. Similar connections are required for the support cable, although in this case the requirements are not as severe inasmuch as electrical connection is not required for the support cable, merely a mechanical connection. The present invention obviates these drawbacks, and allows the transducer 10 to be located at any point on a continuous cable, whether or not it includes signal and/or power conductors or is used solely for support purposes.

Indeed, in a profiling application, cable 6 may be likened to an elevator guide, and transducer 10 may incorporate a variable buoyancy device such that transducer 10 may be programmed (or commanded acoustically) to measure and record flow sequentially at different depths, by changing its buoyancy.

Figure 1B:
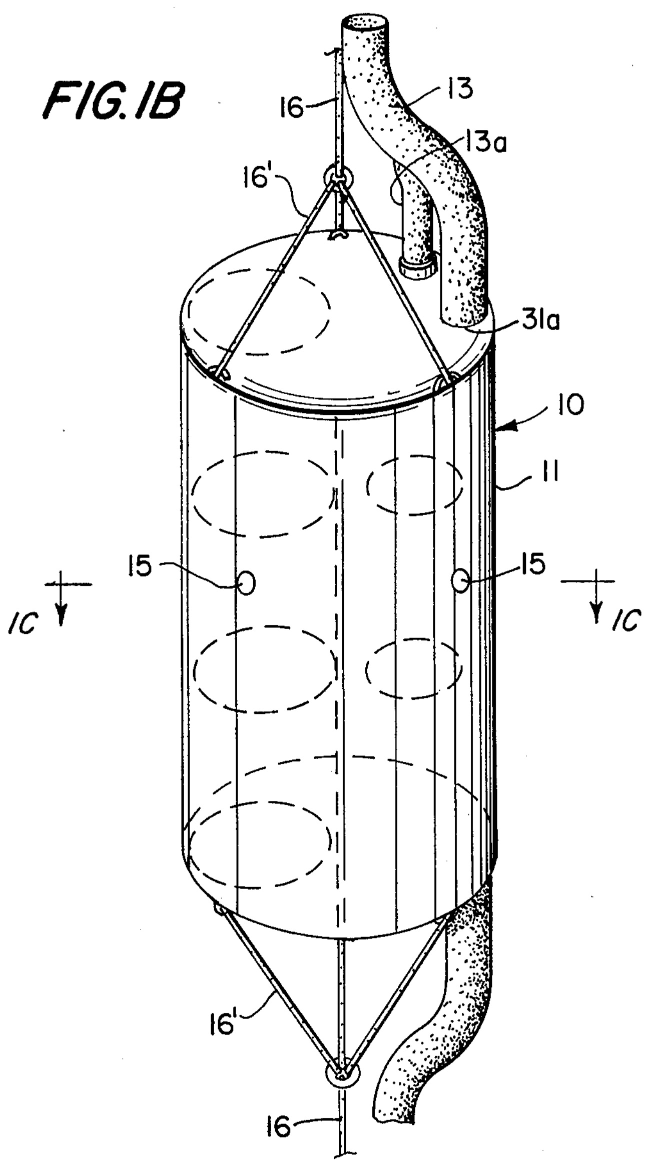
FIG. 1B is an elevation view of a transducer build in accordance with the principles of this invention.
Figure 1C:
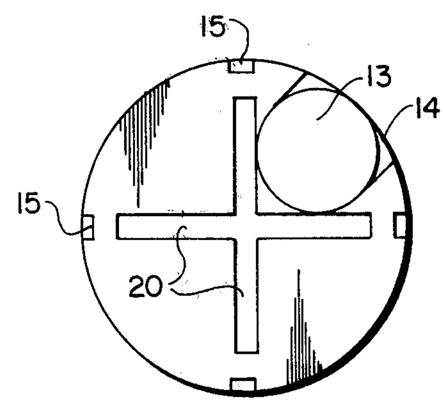
FIG. 1C is a section of FIG. 1B taken on the plane C—C′.

FIG. 1B is an elevation view of one embodiment of the invention, illustrating a transducer 10 which may be supported by a cable 16 and may be connected to one or more conductors in a different cable 13. More particularly, the transducer 10 comprises a housing 11 in the form of a right circular cylinder; those skilled in the art will realize that other housing shapes may be desirable depending on the number of electrodes and the particular application. It is important that the shape of the housing 11 be hydrodynamically determined so as to minimize the disturbance to the flow being measured by the presence of housing 11 itself. Mounted on the surface of the housing 11, or extending slightly beyond the surface of housing 11, are a plurality of sensing electrodes 15. FIG. 1C illustrates a cross-section of the transducer 10, taken on the line C–C′. More particularly, FIG. 1C illustrates that four sensing electrodes 15 are provided, although those skilled in the art will understand that in some circumstances, only two electrodes need be provided. In addition, an electromagnet is included in housing 11 and the poles 20 of such electromagnet are illustrated in FIG. 1C. The poles 20 are illustrated as lying centrally of the circular cross-section of the housing 11. The cable 13 is radially offset from the center and is surrounded by the housing 11, passing through the housing from top to bottom through parts 31 and parallel to the longitudinal axis of the transducer. A section of the housing 14 immediately adjacent to the cable 13 is removable for purposes of inserting the cable 13 within the confines of housing 11. The manner in which the section 14 is made removable is not detailed as there are a variety of means for this purpose. Although electromagnetic poles in the form of a cruciform are illustrated in FIG. 1C, those skilled in the art will understand that the form taken by the core or poles of the electromagnet is not essential to this invention, so long as the magnetic field created thereby is reasonably uniform in the area immediately adjacent the exterior or housing 11, and more particularly immediately adjacent the location of electrodes 15.

As can be seen in FIG. 1B, the support cable 16 does not pass through the housing 11, but it is only the multi-conductor cable 13, which passes through the housing 11. Other embodiments of the invention include provision for a single cable providing both support and conductive connections which does pass through the body of the housing, and can therefore be a single continuous cable. As is illustrated in FIG. 1B, however, a different length of support cable 16 is provided between each of the transducers, and more particularly, each end of the cable 16 terminates in bridle 16' which is attached to the housing 11 by means not illustrated. Those skilled in the art can readily supply a variety of different mechanisms for attaching the bridle 16' to the housing 11 for support purposes. In addition, at least a few electrical connections will be required between multi-conductor cable 13 and the transducer 10. FIG. 1B illustrates a subsidiary cable 13*a* being connected to the transducer although it does not illustrate in detail, how such connections can be made (e.g., through a commercially available waterproof connector). Other embodiments of the invention illustrate this connection in more detail. It will be appreciated that the conductors represented by subsidiary cable 13*a* do not continue beyond the transducer illustrated in this figure.

It should be noted that the cable 13 is shown as extending substantially on the axis of the several transducers. To provide this the cable 13 has bends therein so it passes through the transducer off-axis, or radially offset from the center of the transducer. This feature is important near the surface of a body of water where wave motion may tend to rotate the transducers. Ha ving the cables extend substantially on-axis reduces this tendency. However, for transducers located at depths which are substanially undisturbed by such wave motion, this can be eliminated and the cable or cables can extend off-axis. It is in this configuration that the transducers can be programmed to vary their depth. Of course, with the cable on-axis, and passing through the center of the transducer (which will be disclosed in connection with FIG. 3A and 3B) the transducers may also vary their depth in a programmed fashion.

Figure 2A:
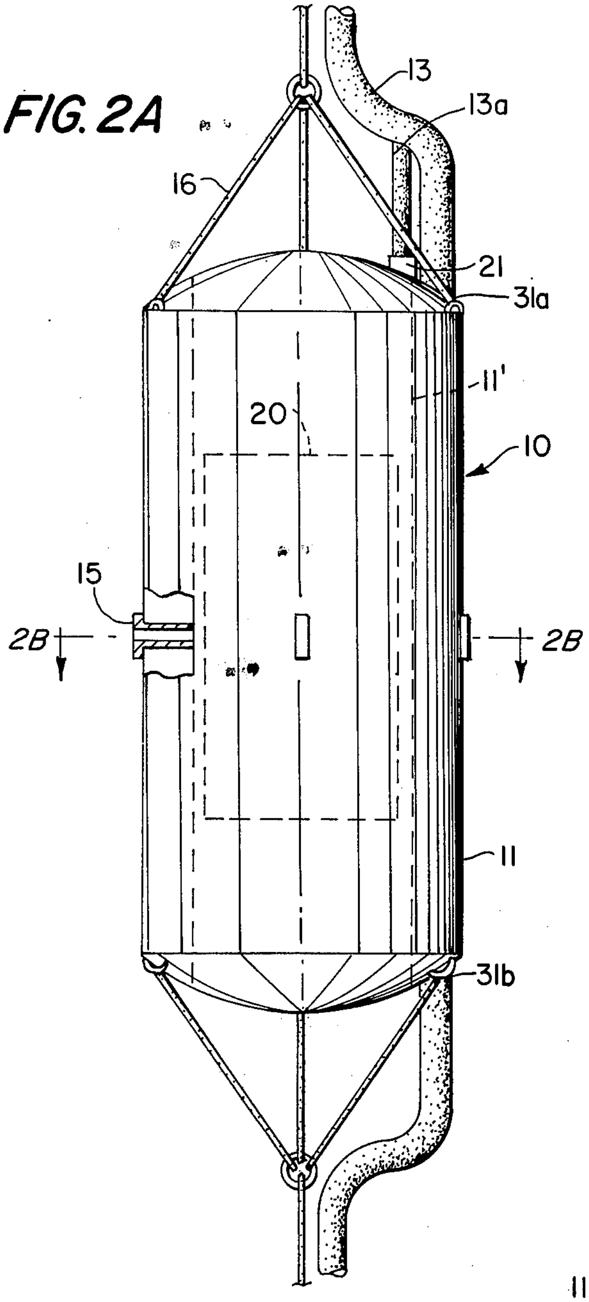
FIG. 2A is an elevation of still another embodiment of the invention.
Figure 2B:
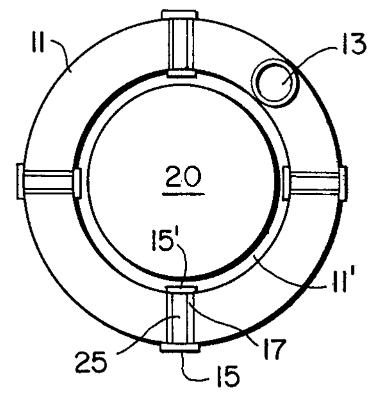
FIG. 2B is a section of FIG. 2A taken on the plane B–B′.
Figure 2C:
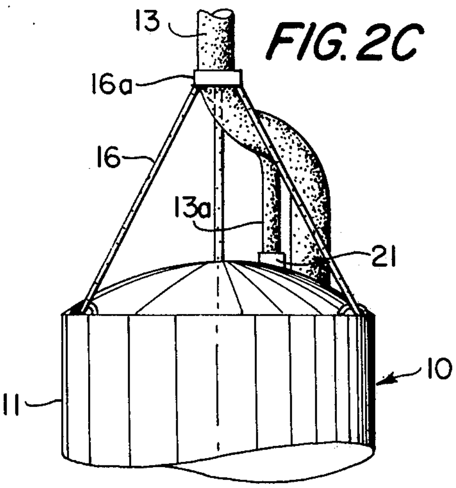
FIG. 2C is an elevation of a modification of the arrangement shown in FIG. 2A.

FIG. 2A, and the cross-section thereof, FIG. 2B, illustrate a different embodiment of the invention, and FIG. 2C illustrates a further modification thereof. FIG. 2A is similar to FIG. 1B in that a multi-conductor cable 13 is provided in addition to separate support cables 16. As in FIG. 1B, the multi-conductor cable 13 passes through the housing 11, in a position radially offset from the cross-section of that housing entering a port 31*a* and exiting at a port 31*b*. Shown dotted in FIG. 2A is electromagnet 20, lying radially centered in planes transverse to the longitudinal extent of the transducer. FIG. 2A differs from FIG. 1B in that the electromagnet 20 may be contained within an inner housing having an outer surface 11'. In fact, the inner housing 11' electromagnet 20 and sensing electrodes, can be as shown in FIG. 2 of my prior U.S. Pat. No. 3,759,097. That is, the inner housing 11' may actually include a complete electromagnetic flow tranducer as described in the aforementioned patent. The previously described housing 11 surrounds, concentrically, the inner housing 11'. Furthermore, in order to maintain the length to diameter of the transducer constant, the housing 11 may have a length exceeding that of the inner housing 11' although this is not illustrated. Each of the sensing electrodes 15 are conductively connected to the corresponding electrode 15', located on the surface of the inner housing 11'. Although a metal conductor 25 is shown in FIGS. 2A and 2B as providing the conductive connection between electrodes 15 and 15', this is not essential. In some circumstances water, or other media surrounding the transducer, can provide a sufficient conductive connection. In those cases the electrode 15 and conductor 25 can be eliminated and their function replaced by conductivity of the water or other media. Surrounding each conductor 25 is an insulator 17. The housing 11 itself is not necessarily water-tight, for instance, the cable 13 both enters and exists from the housing 11. To prevent spurious voltages from being induced into the electrodes by reason of the medium existing between the housings 11 and 11', the adjacent portions of the sensors are insulated from the medium by insulator 17.

The housing 11 is tantamount to a shroud which has the proper external hydrodynamic shape. For coupling the transducer onto a cable the shroud may be slit in an appropriate way to form at least two elements which can be uncoupled from each other to allow insertion or removal of the cable and then re-coupled to unite the elements. For instance, the shroud may be slit longitudinally so as to form two halves (semi-circular in cross-section if the transducer is a right circular cylinder). Preferably the mechanical coupling is located in transverse planes removed from the plane in which the electrodes lie, so as to minimize flow disturbance by reason of this mechanical coupling.

FIG. 2B illustrates a single multi-conductor cable 13 passing through the annular region of the transducer between housing 11 and the outer surfaces 11'. Of course, it would be within the scope of the invention to have multiple cables 13 passing through different sections of this annular region. In a further modification, where multiple cables pass through this annular region, one can be a support cable thus eliminating the requirement for different sections of support cable 16 between different transducers.

With a plurality of transducers 10 mounted on a single cable 13 at various locations thereof, and where the cable 13 includes conductors for conducting signals from the transducers and/or for supplying power to the transducers, obviously conductive connections will have to be made between certain of the conductors in the cable 13 and various ones of the transducers 10. To that end, conductor 13A is shown as being removed from cable 13 and connected to a connector 21 located on the housing 11. Although only one such conductor is illustrated as being connected to connector 21, those skilled in the art will appreciate that any number of conductors may be so connected. The remaining conductors in cable 13 continue past the transducer 10 illustrated in FIG. 2A and may be connected to other transducers located on the cable. It is a significant advantage of the invention that the connections required to be made are only those pertinent to the specific transducer, and no other electrical connections are required.

Although the embodiments illustrated in FIG. 1B and 2A employ a support cable 16 separate and apart from the multiconductor cable 13, those skilled in the art will understand that such is not essential. FIG. 2C illustrates an embodiment wherein a single cable 13 carries the various conductors necessary for signal transmission and/or power supply and, at the same time, supports the string of transducers located at various portions on the cable. A support cable 16 is attached to the housing 11 by means not illustrated, but which are known to those skilled in the art. The other end of support cable 16 is attached to a collar 16A which surrounds the cable 13 and is supported thereby. In this fashion, the housing 11 and transducer 10 may be supported by the cable 13.

Figure 3A:
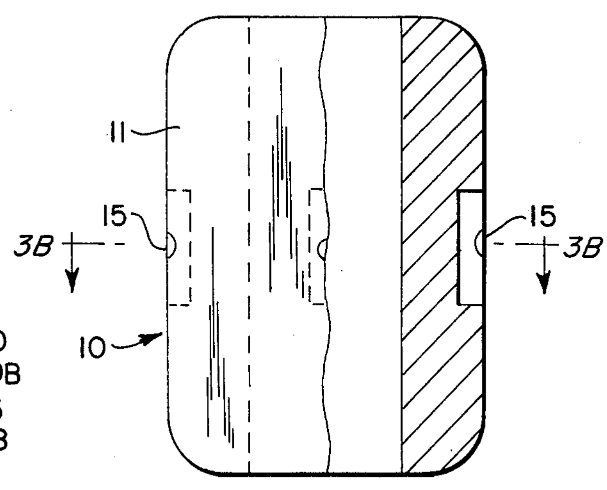
FIG. 3A is a part elevation, part section of another embodiment of the invention; and, FIG. 3B is a section of FIG. 3A taken on the plane B–B′.

In the embodiments so far described, the electromagnetic field producing means comprised a single electromagnet centrally located in the transducer 10. This is a preferred embodiment since it permits a magnetic field that is circularly symmetrical with respect to the transducer axis; there is available a wide body of information on manufacturing technique and performance of an electromagnetic water current meter with such a symmetrical magnetic field. For that reason it was necessary to provide a space in the housing 11 of the transducer 10, radially offset from the center thereof, for running the cable 13 therethrough. I will now describe, in connection with FIGS. 3A and 3B still another embodiment of the invention wherein the cable may be located centrally of the housing 11 of transducer 10. Since the cable is located centrally of the housing 11, the electromagnetic field producing means cannot occupy that position. Since, however, the electromagnetic field adjacent to each of the sensing electrodes must be uniform, and asymmetrically located electromagnetic field producing means would not provide such a uniform field, a different arrangement must be employed in this embodiment for the electromagnetic field producing means. Illustrated in FIG. 3A is a part-elevation, part-section view of a transducer 10 comprising a housing 11, having a plurality of sensing electrodes 15, located on or extending slightly beyond, the surface of the housing 11. As is there illustrated, the housing 11 is in the form of a right circular cylinder. To accommodate the cable 13, which may be employed for support, transmission of electrical signals and/or power, or any of these functions, the transducer 10 has a bore therein centrally located in planes transverse to the longitudinal extent of the transducer.

Figure 3B:
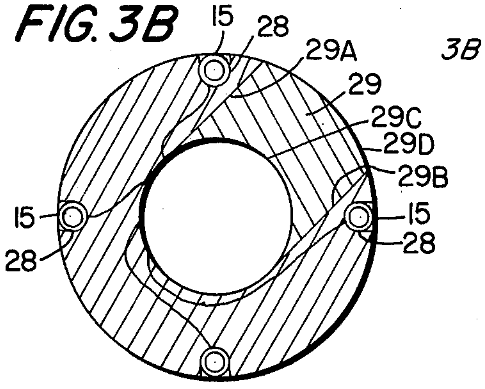

In order, however, to provide the necessary uniform magnetic field adjacent each of the plurality of sensing electrodes 15, a plurality of electromagnetic field producing means 28 are provided, each of which is located adjacent a different one of sensing electrodes 15, as can best be seen in FIG. 3B. As shown in FIGS. 3A and 3B, four electrodes are provided, in two pairs, each one of the electrodes in a pair being located diametrically opposite its associated electrode, and the two pairs are spaced 90° apart on the surface. Those skilled in the art will understand that less than four electrodes can be employed, namely two. In the case, however, of four electrodes, the housing 11 is preferably in the form of a right circular cylinder.

FIG. 3B is a section of FIG. 3A, taken on the plane B′–B′. There illustrated, is the relationship between housing 11, the plurality of electrodes 15, and their associated electromagnetic field producing means 28. Of course, not illustrated in FIG. 3B are the necessary electrical connections to supply power to the electromagnetic field producing means 28 and to sense the voltages on the plurality of electrodes 15. In the manufacture of the transducer, after the electrodes have been mounted on the housing 11, along with their appropriate electromagnetic field producing means, the entire interior of the housing 11 can be "potted," with the exception of the central portion, to thereby provide a bore to accommodate a cable. Furthermore, a segment of the transducer 10 is made removable such as segment 29, illustrated in FIG. 3B. This can most readily be accomplished by providing a blank, having the form of the segment 29 to locate within the housing 11 during the potting operation, so that, in addition to the bore for the cable, the area occupied by the segment 29 will not be potted. A separate mold is provided for fabricating the segment 29 which is in the form of a right cylinder whose circumference includes a pair of parallel sides, 29A and 29B and a separate pair of parallel curved sides, 29C and 29D. Sides 29A and 29B will match with interior wall portions of the housing 11, after potting, the side 29D will form a continuation of the interior wall of housing 11 to define the bore for the cable, and the wall 29C will comprise a circular segment having a radius equal to the radius of the housing 11 and subtending an angle to mate with the incomplete outer circumference of housing 11. Segment 29 is made removable so that, in mounting the transducer 10 on a cable, the cable can be inserted in the bore and the segment replaced. After replacing segment 29, the transducer then surrounds cable. Retaining devices for maintaining the segment 29 in the position illustrated in FIG. 3B are not illustrated, although many are known to those skilled in the art such as threaded bolts outside plane of electrodes, detents, etc. Also not illustrated in FIGS. 3A and 3B are provisions for making the necessary electrical and support connections between the cable and the transducer 10. However, such apparatus can be the same or similar to that shown in FIGS. 1B, 2A and 2C.

To put a transducer string, like that shown in FIG. 1A, into operation the transducers must be attached to the cable at the proper locations. For transducers like that shown in FIG. 1B an appropriate length of cable is paid out, the transducer segment 14 is removed and the cable is placed within the transducer and the segment 14 is replaced to clamp the transducer on the cable. Similar operation will suffice for the transducer of FIGS. 3A and 3B. In the case of the transducer of FIG. 2A the elements of the housing 11 are separated and the cable is located in the annular region between inner housing 11′ and the housing 11. When the elements of the housing 11 are coupled together the cable is located within the now closed housing 11. Of course, if the cable includes conductors, appropriate connections can be made at the same time. If separate support cables are employed they are also attached. The preceding operation is repeated for each of the transducers until the string is complete.

Although each of FIGS. 1B, 2A and 2C illustrates an electrical cable connecting the transducers to surface apparatus for recoding and/or transmitting the data collected by the transducers I wish to emphasize that this is but one embodiment. Self-contained transducers are known to the art and can be employed in my invention. Such transducers carry their own power supply and also some form of data storage and/or non-electrical data transmission arrangement. Thus, these transducers require only a support cable. As illustrated, the continuous cable may then be merely a support cable, which may be attached to the transucer as shown in FIG. 2C, or by some other type of clamping device.

I claim:

1. An electromagnetic flow transducer adapted to be mounted by clamping onto any selected location of a continuous cable comprising:

a cylindrical housing of hydrodynamic shape appropriate for electromagnetic flow measurements including an outer shroud with first and second separable elements, a plurality of electrode means mounted within said housing to sense flow induced voltages, an inner housing and a magnetic field producing means contained within said inner housing and located on an axis of said cylindrical housing for providing uniform fields adjacent said electrode means, said first and second separable elements of said housing including means for separating to allow insertion and removal of said continuous cable from within said housing, said housing having at least one port to allow said cable to enter or exit therefrom, said port located off a longitudinal axis of said cylindrical housing.

2. The apparatus of claim 1 in which said inner housing includes a plurality of inner electrodes, equal in number to the plurality of electrode means, and means conductively connecting an inner electrode and a corresponding one of said electrode means.

3. The apparatus of claim 2 wherein said means conductively connecting an inner electrode and a corresponding one of said electrode means comprises water.

4. The apparatus of claim 1 in which said first and second separable shroud elements each are of semi-circular cross-section.

5. The apparatus of claim 4 in which said inner housing includes a plurality of inner electrodes equal in number to the plurality of electrode means, and means conductively connecting an inner electrode and a corresponding one of said electrode means.

6. The apparatus of claim 4 wherein said first and second separable shroud elements each are of semi-circular cross-section.

7. The apparatus of claim 4 wherein said continuous cable is a support cable for supporting said at least one transducer.

8. The apparatus of claim 7 wherein said continuous cable includes a plurality of conductors and means coupling at least some of said conductors to said at least one transducer.

9. Apparatus for measuring flow velocity in a body of water at a plurality of depths including a plurality of electromagnetic flow transducers located at different depths on a single continuous cable, wherein at least one of said transducers is adapted to be mounted by clamping onto any selected location of a continuous cable, said at least one transducer comprising:

a cylindrical housing of hyrodynamic shape appropriate for electromagnetic flow measurements comprising a shroud with first and second separable elements, a plurality of electrode means mounted within said housing to sense flow induced voltages, an inner housing and a magnetic field producing means within said inner housing and located on an axis of said cylindrical housing for providing uniform fields adjacent said electrode means, said first and second separable housing elements including means for separating to allow insertion and removal of said continuous cable from within said housing, said housing having at least one port to allow said cable to enter or exit therefrom, said port located off a longitudinal axis of said cylindrical housing.

10. The apparatus of claim 9 wherein said means conductively connecting an inner electrode and a corresponding one of said electrode means comprises water.

* * * * *